(12) United States Patent
Jung et al.

(10) Patent No.: US 8,750,434 B2
(45) Date of Patent: Jun. 10, 2014

(54) METHOD AND APPARATUS FOR DEMODULATING A SIGNAL IN A COMMUNICATION SYSTEM

(75) Inventors: Hyejung Jung, Palatine, IL (US); Vijay Nangia, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 22 days.

(21) Appl. No.: 13/456,605

(22) Filed: Apr. 26, 2012

(65) Prior Publication Data

US 2013/0287150 A1 Oct. 31, 2013

(51) Int. Cl.
*H04L 27/06* (2006.01)
*H03D 1/04* (2006.01)
*H04L 5/12* (2006.01)

(52) U.S. Cl.
USPC .............. 375/341; 375/346; 375/261

(58) Field of Classification Search
USPC .......................... 375/261, 260, 259
See application file for complete search history.

(56) References Cited

U.S. PATENT DOCUMENTS

| | | | |
|---|---|---|---|
| 7,680,211 B1 | 3/2010 | von der Embse | |
| 7,848,464 B2 | 12/2010 | Hwang et al. | |
| 2006/0269005 A1* | 11/2006 | Laroia et al. | 375/260 |
| 2011/0274059 A1* | 11/2011 | Brown et al. | 370/329 |
| 2011/0317542 A1* | 12/2011 | Brown et al. | 370/210 |

OTHER PUBLICATIONS

Jiakang Zhang et al.: "Joint Channel Estimation and Multi-User Detections ofr SDMA OFDM Based on Dual Repeated Weighted Boosting Search", ICC 2011—2011 IEEE International Conference on Communications—Jun. 5-9, 2011—Kyoto, Japan, IEEE, Piscataway, NJ, USA, Jun. 5, 2011, all pages.
Amin M G et al.: "A Hybrid Adaptive Blind Equalization Algorithm for QAM Signals in Wireless Communications", IEEE Transactions on Signal Processing, IEEE Service, Center, New York, NY, US, vol. 52, No. 7, Jul. 1, 2004, pp. 2058-2069.
Ming Jiang et al.: "Multiuser MIMO-OFDM for Next-Generation Wireless Systems", Proceedings of the IEEE, IEEE. New York, US, vol. 95, No. 7, Jul. 1, 2007, pp. 1430-1469.
Pantelis-Daniel Arapoglou et al.: "MIMO over Satellite: A Review", IEEE Communications Surveys, IEEE, New York, NY, US, vol. 3, No. 1, Jan. 1, 2011, pp. 27-51, all pages.
Patent Cooperation Treaty, International Search Report and Written Opinion of the International Searching Authority for International Application No. PCT/US2013/037910, Oct. 4, 2013, 13 pages.

* cited by examiner

*Primary Examiner* — Chieh M Fan
*Assistant Examiner* — Brian J Stevens

(57) ABSTRACT

A joint soft output ML receiver that is able to reduce interference based on partial transmission information (i.e., without knowing the existence of other layers or other users and their modulation schemes) is described. In one implementation, the partial information based joint ML receiver can achieve performance that is similar to full information based joint ML receivers even when full information regarding the interfering UE is not available at the desired UE due to transparent Multi-user Multiple Input and Multiple Output (MU-MIMO) transmission (such as with TM 8 and TM 9 transmissions in EUTRA LTE).

21 Claims, 7 Drawing Sheets

METHOD AND APPARATUS FOR DEMODULATING A SIGNAL IN A COMMUNICATION SYSTEM

TECHNICAL FIELD

The present invention relates generally to communication systems and, more particularly, to a method and apparatus for demodulating a signal in a communication system.

BACKGROUND

Although communication systems have seen considerable advancement over the last few decades, signal interference is still a challenge. Interference can occur in a variety of different forms. One form is interference between spatially multiplexed multiple communication layers on a time-frequency resource. For example, in a cellular communication system, signals from an access point intended for one device may interfere with signals intended for another device.

BRIEF DESCRIPTION OF THE DRAWINGS

Various embodiments of the present invention will now be described below in more detail, with reference to the accompanying drawings.

It is to be noted, however, that the appended drawings illustrate embodiments of this invention and are therefore not to be considered limiting of its scope, for the invention may admit to other equally effective embodiments.

DETAILED DESCRIPTION

Figure 1:
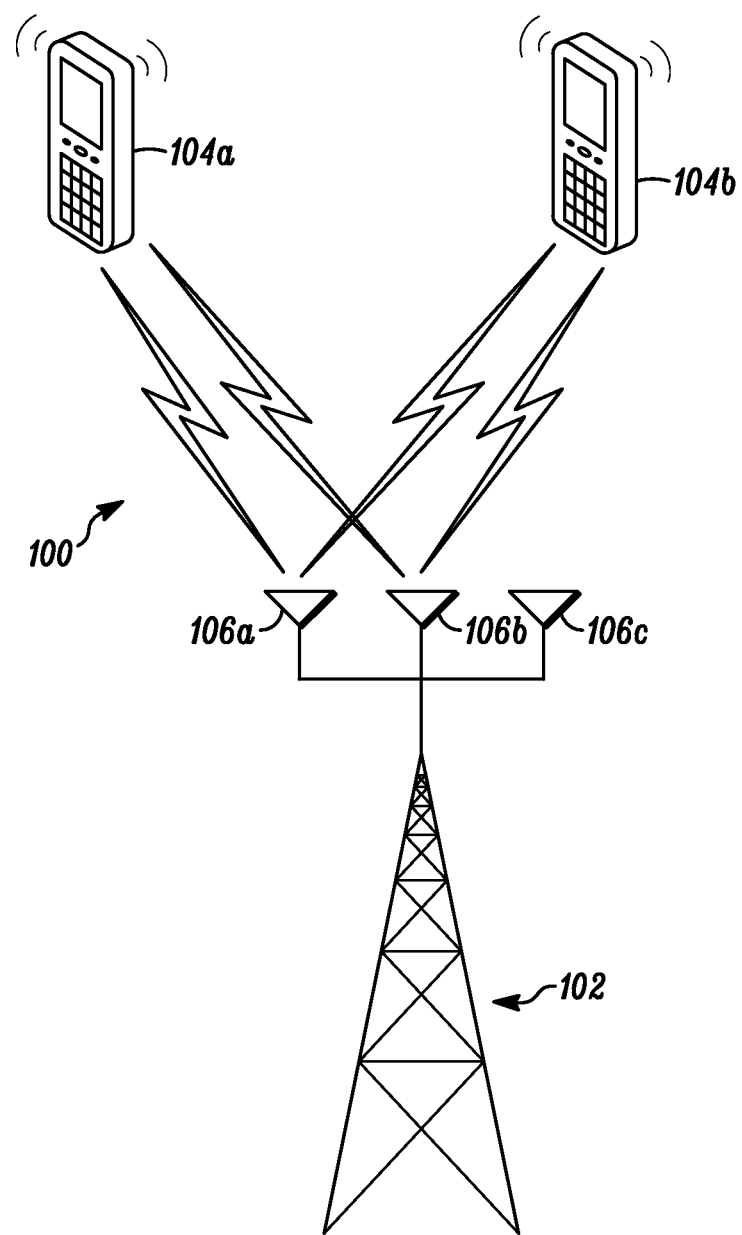
FIG. 1 depicts an example of a communication system in which an embodiment of the invention may be implemented.

In accordance with the foregoing, various embodiments of a method for demodulating a signal in a communication system are disclosed herein. In an embodiment of the invention, a first user equipment (UE) receives a signal (containing a data stream on one or more spatial layers) on a time-frequency resource and a message (which may be a scheduling assignment message). The signal may have multiple spatial layers, including a first spatial layer and a second spatial layer. In the message, a modulation scheme associated with the first spatial layer is indicated. The message does not, however, indicate a modulation scheme associated with the second spatial layer. The first UE (also referred to as the "desired UE") demodulates the signal based on a first modulation scheme, a second modulation scheme, and a third modulation scheme. The second and third modulation schemes may represent a hypothesis of the modulation scheme being used for the second spatial layer. The second spatial layer may be for a second UE (often referred to as the "interfering UE"). However, the first UE does not necessarily know the modulation scheme being used for the second spatial layer, and may not even be aware of the existence of the second spatial layer. The first UE calculates a soft value of a bit of a code word of the data stream based on the first, second and third modulation schemes. To do so, the first UE may compute an average of the values representing bit probabilities of the second and third modulation schemes or calculate the value representing bit probability based on a constant term associated with the symbol probabilities of the second and third modulation schemes and a distance metric. The second UE and indeed any other UE in the communication system may also include an embodiment of the invention.

In another embodiment of the invention, a first UE receives a signal on a time-frequency resource, the signal comprising one or more spatial layers wherein at least one spatial layer (the "first spatial layer") is intended for the first UE, and receives an indication of a modulation scheme (the "first modulation scheme") that is associated with the first spatial layer in a scheduling assignment message. The scheduling assignment message may not indicate a modulation scheme associated with the other spatial layers in the received signal. The first UE calculates a soft value of a channel-coded bit of a code word associated with the first spatial layer, based on the first modulation scheme and two or more hypotheses regarding modulation schemes of the other spatial layer(s) in the received signal. The two or more hypotheses of modulation schemes of the other spatial layer(s) may be selected from one or more modulation schemes supported by the communication system. If two hypotheses are used, for example, the soft value of the channel-coded bit is based on a first soft metric and a second soft metric. The first soft metric is based on a hypothesis of a second modulation scheme (the hypothesis being that the second modulation scheme is associated with spatial layer(s) other than the first spatial layer) and the second soft metric is based on a hypothesis of a third modulation scheme (the hypothesis being that the third modulation scheme is associated with spatial layer(s) other than the first spatial layer).

In another embodiment of the invention, a first UE receives a first and second signal, but does not know the modulation scheme being used or associated with a second signal (and may not even know of the existence of the second signal). The second signal may be for a second UE. The first signal has a first modulation scheme associated with it. The first UE hypothesizes that one of a second and a third modulation scheme is being used for the second signal to modulate the second signal, and calculates the value representing probability of a bit of a code word of the data stream being a 1 or a 0 based on an average of the values representing bit probabilities of the hypothesized second and third modulation schemes.

In another embodiment of the invention, a first UE receives a first and second signal, but does not know the modulation scheme being used by a second signal (and may not even know of the existence of the second signal). The first signal has a first modulation scheme. The second signal may be for a second UE. The first UE hypothesizes that one of a second and a third modulation scheme is being used to modulate the second signal. The first UE calculates a value representing the probability of a bit of a code word of the data stream being a 1 or a 0 based on a constant term associated with the symbol probabilities of the hypothesized second and third modulation schemes and a distance metric which is calculated based on the hypothesized modulation scheme and the received signal.

In another embodiment of the invention, a first UE receives a first and second signal, but does not know the modulation scheme being used by a second signal (and may not even know of the existence of the second signal). The first signal has a first modulation scheme. The second signal may be for a second UE. The first UE calculates a value representing the probability of a bit of a code word of the data stream being a 1 or a 0 based on a fourth modulation scheme, the fourth modulation scheme being a hybrid of a second and a third modulation scheme. Also, the fourth modulation scheme is not among the modulation schemes supported by a communication system in which the first and second UEs are a part. The first, second, and third modulation schemes are, on the other hand, recognized and supported by the communication system.

There are many contexts in which the various embodiments may be used. One such context is in a Third Generation Partnership (3GPP) Evolved Universal Terrestrial Radio Access (EUTRA) Long Term Evolution (LTE) network context. In 3GPP EUTRA LTE Release-9 Transmission Mode (TM) 8 or Release-10 TM 9, downlink multi-user transmission on antenna port 7 and antenna port 8 is transparent to a UE. That is, the UE does not have knowledge of whether another antenna port or transmission layer is associated with the transmission to another UE or not. Indeed, the UE may not even be aware of the existence of any other UE.

A technical context for the various embodiments of the invention will now be given. A joint soft output Maximum Likelihood (ML) receiver for multi-user or spatial multiplexing multi-layer transmissions is a kind of receiver that is optimal and that generally outperforms a Minimum Mean Square Error (MMSE) receiver. However, the joint soft output ML receiver generally needs full knowledge of the modulation orders (modulation schemes) of all transmission layers to function effectively. If the joint soft output ML receiver uses an incorrect assumption regarding the modulation order of an interfering UE, its performance in terms of throughput may be degraded significantly.

An embodiment of the invention described herein is a joint soft output ML receiver that is able to reduce interference based on partial transmission information (i.e., without knowing the existence of other layers or other users or UEs and their modulation schemes). In this embodiment, the disclosed partial information based joint ML receiver can achieve performance that is similar to full information based joint ML receivers even when full information regarding the interfering UE is not available at the desired UE due to transparent Multi-user Multiple Input and Multiple Output (MU-MIMO) transmission with TM 8 and TM 9 transmissions in EUTRA LTE.

Another embodiment of the invention is a partial information-based joint ML receiver that incorporates the uncertainty on the modulation schemes of interfering UEs (or signals or layers) into the soft bit probability computation (computation of soft value associated with a bit representing a probability of the bit being a 1 or a 0) performed by the desired UE. For example, the final output log-likelihood ratio (LLR) (or, more generally, "soft value") can be a function of the individual LLRs obtained by assuming a different modulation scheme for the interfering layer. In another embodiment, a newly defined LLR (which considers the uncertainty of the modulation schemes of the interfering UE or UEs or signals or layers) may be computed by reusing the existing LLR computation blocks with minimal modifications.

Still another embodiment of the invention is a receiver that uses a reference Quadrature Amplitude Modulation (QAM) constellation for the interfering UE/layer that is a function of two or more of the possible QAM modulation constellations that can be transmitted on the interfering layer (e.g., mixed constellation points of 16QAM and 64QAM).

Various embodiments of the invention described herein involve QAM. QAM is a signal modulation scheme that generates two analog message signals or two digital bit streams by modulating the amplitudes of two carrier waves. Such modulation can be effected by using amplitude-shift keying (ASK) digital modulation or amplitude modulation (AM) analog modulation. The two carrier waves, typically sinusoids, are out of phase with each other by 90°. The two carriers can be considered independent components or channels: an I (In-phase) component—the "real" component and a Q (Quadrature) component—the imaginary component. The I and Q components are considered orthogonal or in quadrature because they are separated by 90 degrees.

Figure 4:
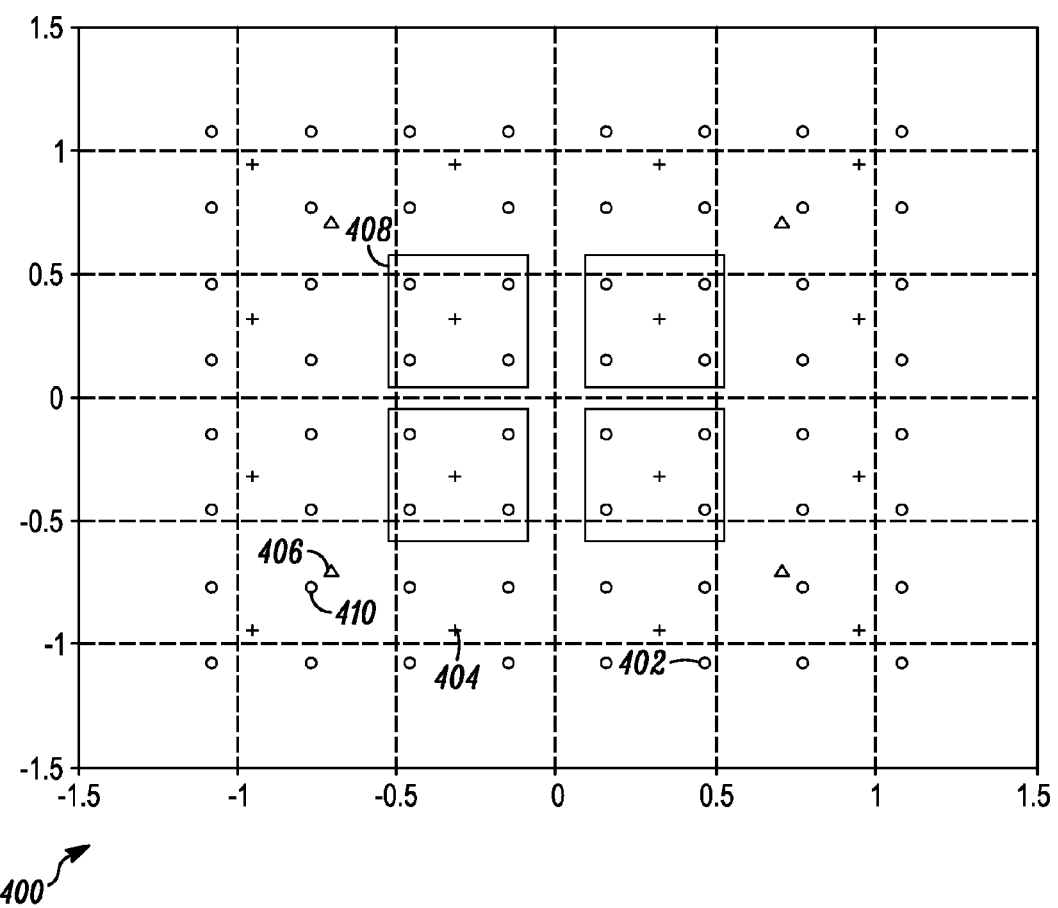
FIG. 4 is a constellation diagram depicting a modulation scheme that is a hybrid of a 16QAM modulation scheme and a 64QAM modulation scheme according to an embodiment of the invention.
Figure 5:
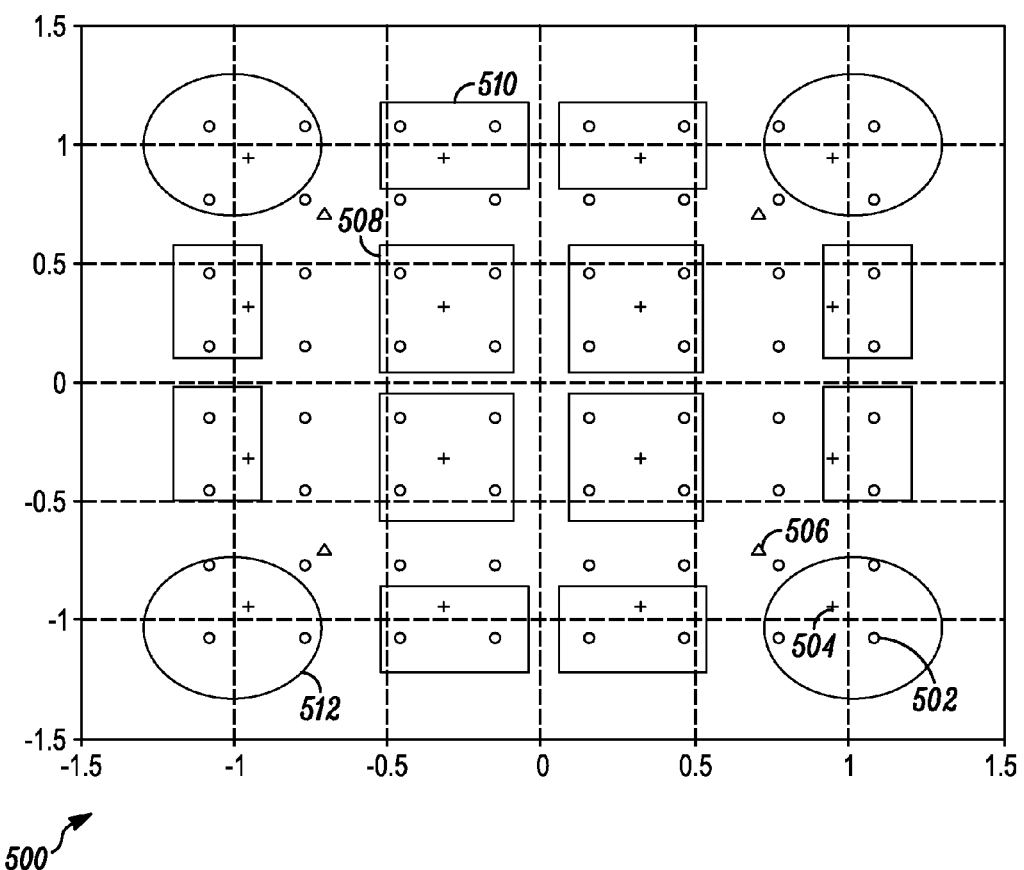
FIG. 5 is a constellation diagram depicting a modulation scheme that is a hybrid of a 16QAM modulation scheme and a 64QAM modulation scheme according to another embodiment of the invention.
Figure 6:
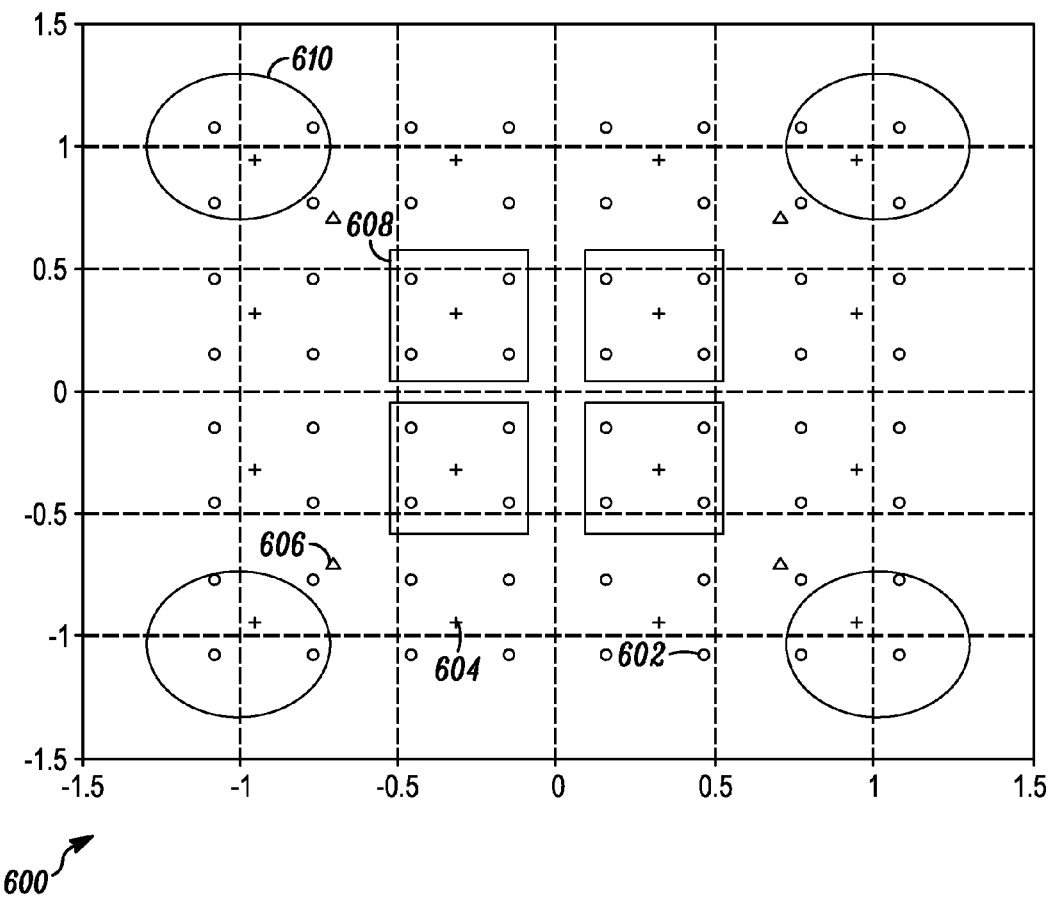
FIG. 6 is a constellation diagram depicting a modulation scheme that is a hybrid of a 16QAM modulation scheme and a 64QAM modulation scheme according to yet another embodiment of the invention.

Discrete combinations of I and Q components of a signal can be mapped to the complex plane by representing the I component in a horizontal axis and the Q component in vertical axis, and plotting each combination of I and Q components. Such a mapping will be referred to herein as a "constellation diagram." The number of constellation points plotted on the constellation diagram for a modulation scheme and/or the size of the modulation scheme is referred to as the "cardinality" of the modulation scheme. FIGS. 4-6 each depict a constellation diagram. Three sets of points are plotted on each of the constellation diagrams. Each set of plots represents a different modulation scheme. The triangles (reference number 406 in FIG. 4, 506 in FIG. 5, and 606 in FIG. 6) represent Quadrature Phase Shift Keying or QPSK, which can have four I and Q combinations (four states). The crosses or pluses (reference number 404 in FIG. 4, 504 in FIG. 5, and 604 in FIG. 6) represent 16-state QAM (16QAM). 16QAM has sixteen possible states. The circles (reference number 402 in FIG. 4, 502 in FIG. 5, and 602 in FIG. 6) represent 64-state QAM (64QAM). 64QAM has sixty-four possible states. Other schemes are possible. In the various QAM schemes, each point on the complex plane, called as a modulation symbol, can be assigned a set of binary values according to an employed binary coding scheme (e.g Gray coding). The bit length of the modulation symbol generally depends on the number of available I and Q combinations or the number of states. For example, in the QPSK scheme, each symbol is two bits long, in the 16QAM scheme, each symbol is four bits long, and in the 64QAM scheme, each symbol is six bits long. The probability of a particular symbol of a data stream matching a particular point on the constellation diagram of the modulation scheme (e.g., the probability of a symbol of a 64QAM scheme being equal to the point that matches the code 000 100) is referred to as the "symbol probability."

An example of a communication system in which the invention may be implemented will now be described. Referring to FIG. 1, the communication system (which may be wireless), is generally labeled 100. The communication system 100 includes an access point 102, a first UE 104a and a second UE 104b. The first UE is being used by a first user (not shown) and the second UE is being used by a second user (not shown). The UEs 104a and 104b may be any of a variety of devices, including a cell phone (smartphone or otherwise), a dongle, a notebook computer, tablet computer, or machine having cellular capabilities. Similarly, the access point 102 may be any of a variety of devices, including a access terminal (AT), base unit or base station of a cellular network, Node-B (NB), enhanced Node-B (eNB), relay node, home eNB, pico eNB, femto eNB, a wireless router, or a mobile device acting as a wireless access point or by other once, present or future terminology used in the art. The access point 102 serves a number of UEs 104a and 104b within a serving area or cell or within a sector thereof. The UEs may be fixed units or mobile terminals. The UEs may also be referred to as subscriber units, mobile units, users, terminals, subscriber stations, remote units, user terminals, wireless communication terminal, wireless communication device or by other terminology used in the art. The APs communicate with UEs to perform functions such as scheduling the transmission and receipt of information using radio resources. The wireless communication network may also comprise management functionality including information routing, admission control, billing, authentication etc., which may be controlled by other network entities.

Each of the UEs 104a and 104b includes a receiver, an embodiment of which will be described below. In one embodiment, the UEs 104a and 104b are 4G LTE phones with ML receivers. The UEs 104a and 104b may, in addition, have other receivers. The AP 102 is a base station of a 4G LTE network and has MU-MIMO capability. The AP 102 may comprise one or more transmitters and one or more receivers that serve the UEs. The number of transmitters at the AP 102 may be related, for example, to the number of transmit antennas at the AP 102. The AP 102 has multiple antennas, including a first antenna 106a, a second antenna 106b, and a third antenna 106c. The UEs 104a and 104b may also include one or more transmitters and one or more receivers. The number of transmitters may be related, for example, to the number of transmit antennas at the UE. Each of the mobile devices 104a and 104b may also have multiple antennas.

In one embodiment, the UEs 104a and 104b have multiple receive antennas communicating with the AP 102, and the AP 102 has multiple transmit antennas, and support Multiple-Input Multiple-Output (MIMO) communication. The UEs 102a and 102b receive data in one or more spatial layers in one or more resource blocks (RBs). The AP 102 precodes the data to be communicated on one or more spatial layer and maps and transmits the resulting precoded data on one or more antenna ports. The effective channel (or beamformed channel) corresponding to a spatial layer may in general be estimated based on reference signals mapped to one or more antenna ports. In particular, in 3GPP LTE Release 10, demodulation based on DMRS (demodulation reference signal or UE-specific reference signal) is supported based on antenna ports numbered as 7-14. An effective channel corresponding to each of the spatial layers 1-8 can be inferred from the reference signal transmission on each one of these antenna ports 7-14. This means that a channel corresponding to a spatial layer can be estimated based on the reference signals corresponding to the antenna port associated with the layer.

An "antenna port" is a logical port that may correspond to a beam (resulting from beamforming) or may correspond to a physical antenna. An antenna port may be defined such that a channel over which a symbol on the antenna port is conveyed can be inferred from the effective channel over which another symbol on the same antenna port is conveyed. More generally, an antenna port can correspond to any well-defined description of a transmission from one or more of antennas. As an example, it could include a beamformed transmission from a set of antennas with appropriate antenna weights being applied, where the set of antennas itself could be unknown to the UE. In some particular implementations "antenna port" can also refer to a physical antenna port at the AP. In certain cases, the beamforming or precoding applied at the AP may be transparent to the UE. In other words, the UE need not know what precoding weights are used by the AP for a particular transmission on the downlink.

Figure 2:
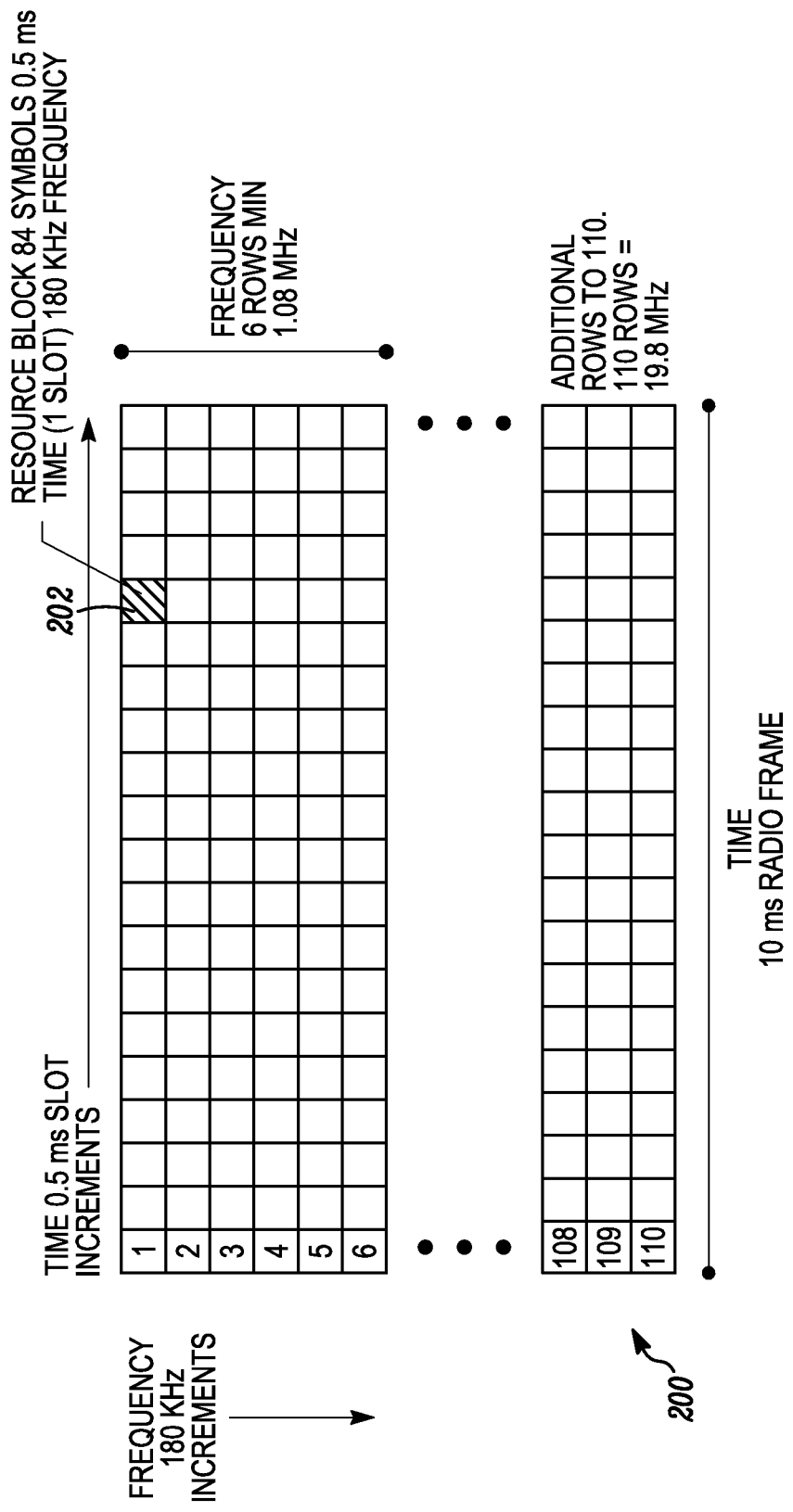
FIG. 2 depicts an example of a time-frequency resource that may be employed in an embodiment of the invention.

In an embodiment of the invention, the access point 102 transmits signals to UEs 104a and UE 104b on radio resources such as over a time-frequency resource. An example of such a time-frequency resource will now be described with reference to FIG. 2. FIG. 2 shows an LTE frame 200 having a number of resource blocks 202 spread over a time period of 10 milliseconds and over a frequency range of 19.8 megahertz. One or more of such frames is an example of a time-frequency resource. Each resource block occupies a 0.5 millisecond time slot and occupies a frequency bandwidth of 180 kilohertz. One or more of the resource blocks is also a time-frequency resource.

Continuing with FIG. 2, the frame 200 is divided into subframes, of 2 timeslots (1 millisecond) each. Allocation of data is generally by the sub-frame. On the frequency axis, each increment of 180 kilohertz includes 12 sub-carriers of 15 kilohertz each. The frame 200 as a whole can also be considered a time-frequency resource. Each resource block is 0.5 milliseconds (1 time slot) by 180 kilohertz, and contains up to 84 sub-carriers, 12 sub-carriers per orthogonal-frequency division multiplexing (OFDM) symbol times 7 OFDM symbols. The number of OFDM symbols per resource block is dependent on the cyclic prefix (CP) length being used. Each signal containing the frame 200 can have multiple spatial transmission layers, each of which can have a data stream. Alternatively a data stream can be mapped to one or more spatial layers.

According to an embodiment of the invention, each data stream contains one or more code words. Each code word contains a series of bits. The number of bits in a code word is variable and may be relatively small (e.g., tens of bits) or relatively large (e.g., thousands of bits) or anywhere in between. Furthermore, the data stream is organized into transport blocks, which are used to transport the code words. In one embodiment, each transport block carries one code word. In addition to a code word, each transport block includes an error detecting code.

A communication scenario according to an embodiment of the invention will now be described. The access point 102 (FIG. 1) transmits signals on one or more antenna ports using the first antenna 106a and the second antenna 106b over a physical downlink shared channel (PDSCH). The signals from the first and second antennas 106a and 106b are transmitted in either 3GPP EUTRA LTE Release 9 Transmission Mode (TM) 8 or Release 10 TM 9. They, and the data streams thereof, are logically organized into frames, such as the frame 200 of FIG. 2. In one embodiment, a first signal comprising a first spatial layer with a first data stream is transmitted on antenna port 7 and a second signal comprising a second spatial layer with a second data stream is transmitted on antenna port 8. The signals are received by the first UE and by the second UE. The first data stream is intended for the first UE 104a, while the second data stream is intended for the second UE 104b. It is to be noted that the a single signal (e.g., the first signal) could contain both the first and the second spatial layers and the processes described for reducing interference would work the same. The use of two separate signals in these examples is meant to enhance clarity.

Figure 3:
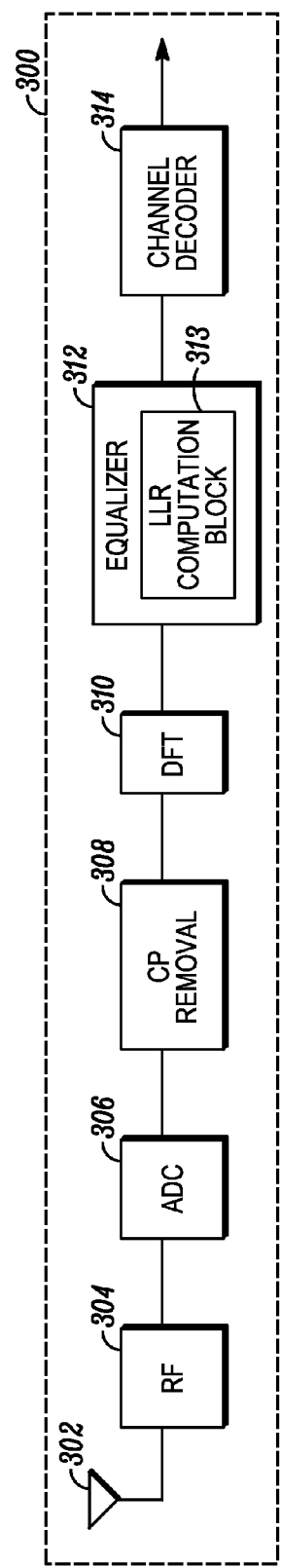
FIG. 3 depicts a block diagram showing how either of the UEs of FIG. 1 processes received signals according to an embodiment of the invention.

Referring to FIG. 3, a block diagram showing how either of the UEs of FIG. 1 processes the received signals according to an embodiment of the invention will now be described. It is to be understood that the blocks shown are functional blocks and do not necessarily represent a particular physical architecture. Each of the UE's 104a and 104b includes a receiver, generally labeled 300 which, in this embodiment, is an ML receiver. The receiver 300 receives signals from each of the first and second antennas 106a and 106b of the access point 102 at the antenna 302 of the receiver 300. The signal is processed by the RF module 304, which translates the signal from a carrier frequency to a baseband signal. The baseband signal is then converted into digital data by an analog to digital converter (ADC) 306. A CP removal module 308 removes the cyclic prefix from the digital data. A Discrete Fourier Transform (DFT) module 310 converts the digital data from a time domain to a frequency domain according to a DFT. The DFT may be efficiently implemented as a Fast Fourier Transform (FFT). An equalizer 312 then reduces interference in the digital data (by filtering, for example). A Log-Likelihood Ratio (LLR) computation block 313 or more generally, a soft value computation block in the equalizer 312 generates an LLR for each bit in the digital data (or "data stream"). The LLR represents a soft value associated with a bit representing a probability of the bit being a 1 or a 0. This value constitutes a "soft bit." Each code word in the data stream has a set of LLRs associated with it. Finally, a channel decoder 314 decodes the symbols contained in the digital data using one or more error correction codes (e.g., a turbo code, a convolutional code, or a block code, depending on the code used to transmit the received signal). The channel decoder 314 may also apply further levels of decoding, such as by performing a cyclic redundancy check (CRC). Each code word has a CRC associated with it. By performing these steps, the channel decoder 314 converts the symbols contained in the data stream into data that can be used by other components (such as an application processor) of the UE of which it is a component. In other words, the channel decoder converts the soft bits into information bits and outputs the information bits.

There are many possible ways in which the LLR computation block 313 can reduce interference. One way in which this reduction can be accomplished will now be described, with the assumption that the receiver 300 is contained in the first UE 104a (of FIG. 1), and is attempting to process the first spatial layer (e.g., on antenna port 7), but is also receiving the second spatial layer (e.g., on antenna port 8), which is intended for the second UE 104b. It is to be noted that the first and second spatial layers may be part of the same signal or may be part of separate signals (e.g., a first signal and a second signal). Because the process will be described from the point of view of first UE 104a, the first UE 104a will be considered the "desired UE," while the second UE 104b will be considered the "interfering UE." According to an embodiment of the invention, the LLR computation block 313 references the constellation map 400 of FIG. 4. It then generates sets of channel bit log-likelihood ratios (LLRs) or soft values, based on a first set of soft values (or LLRs) and a second set of soft values (or LLRs). When generating the first set of LLRs $\{LLR_{16QAM}(i)\}$, the LLR computation block 313 assumes that the interfering UE uses a 16QAM modulation scheme and calculates the soft values as:

$$LLR_{16QAM}(i) = \ln\left[\frac{P(x|b_{1,i}=1)}{P(x|b_{1,i}=0)}\right] = \quad (1)$$

-continued
$$\ln\left[\frac{\sum_{k:b_{1,i}=1}\sum_{j\in 16QAM} P(x|s_{1,k},s_{2,j})\cdot P(s_{1,k})\cdot P(s_{2,j})}{\sum_{k:b_{1,i}=0}\sum_{j\in 16QAM} P(x|s_{1,k},s_{2,j})\cdot P(s_{1,k})\cdot P(s_{2,j})}\right],$$

where x represents the received signal vector across multiple receive antennas, $s_{l,k}$ QAM symbol transmitted on the l-th transmission layer, $b_{1,i}$ the i-th channel bit on the first transmission layer, and j and k are QAM symbol indices, wherein $j \in 16QAM$ means that j is an index of 16QAM symbols and $k:b_{1,i}=1$ (or $k:b_{1,i}=0$) means that k is an index of modulation symbols which are part of the first modulation scheme and have a bit being 1 (or 0) on the i-th channel bit. In addition, $P(\bullet|\bullet)$ denotes a conditional probability, $\ln(\bullet)$ a natural log, and $P(s_{l,k})$ is a probability that the QAM symbol $s_{l,k}$ is transmitted. The term $s_{1,k}$ is a QAM symbol from the data stream of a spatial layer intended for the desired UE (e.g., the first spatial layer), while the term $s_{2,k}$ is a symbol from spatial layer of the interfering UE (e.g., the second spatial layer). If each QAM symbol in the constellation map is equally probable, that is, $P(s_{l,k})=P(s_{l,k'})$, $k \neq k'$, the LLR computation block 313 calculates $LLR_{16QAM}(i)$ by approximation as follows:

$$LLR_{16QAM}(i) \approx \min_{k:b_{1,i}=1}\min_{j\in 16QAM}\frac{\|x-H[s_{1,k}\ s_{2,j}]^T\|^2}{\|n\|^2} - \quad (2)$$
$$\min_{k:b_{1,i}=0}\min_{j\in 16QAM}\frac{\|x-H[s_{1,k}\ s_{2,j}]^T\|^2}{\|n\|^2},$$

where H represents MIMO channel matrix, n additive Gaussian noise vector, $\min(\bullet)$ takes the smallest value among compared values, $(\bullet)^T$ denotes transpose, and $\|\bullet\|$ 2-norm (Euclidean distance). When generating the second set of LLRs $\{LLR_{64QAM}(i)\}$, the LLR computation block 313 assumes that the interfering UE uses a 64QAM modulation scheme and calculates the soft values as follows (if each QAM symbol in the constellation map is equally probable):

$$LLR_{64QAM}(i) \approx \min_{k:b_{1,i}=1}\min_{j\in 64QAM}\frac{\|x-H[s_{1,k}\ s_{2,j}]^T\|^2}{\|n\|^2} - \quad (3)$$
$$\min_{k:b_{1,i}=0}\min_{j\in 64QAM}\frac{\|x-H[s_{1,k}\ s_{2,j}]^T\|^2}{\|n\|^2},$$

In one embodiment, the LLR computation block 313 calculates the resulting set of soft values associated with the set of channel-coded bits as averages of two sets of LLRs, i.e., $LLR_{1,i}=0.5\cdot(LLR_{16QAM}(i)+LLR_{64QAM}(i))$. More generally, the resulting set of soft values can be calculated as $$LLR_{1,i}=w\cdot LLR_{16QAM}(i)+(1-w)\cdot LLR_{64QAM}(i) \quad 0\leq w\leq 1 \quad (4)$$

where w is a weight factor, resulting in a weighted average. The weight factor may be selected based on the probability that the interfering UE uses a 16QAM modulation scheme or a 64-QAM modulation scheme. The set of LLRs resulting from a weight factor w=0.5 (averaging) approximates a set of LLRs that would be generated under the assumption that the probability of the actual modulation scheme of the interfering UE being 16QAM is equal to the probability of the actual modulation scheme being 64QAM. Since a QPSK constellation is approximately a subset of a 64QAM (as represented by the point 406 of FIG. 4, which is very close to the point 410), the LLR computation block 313 may not need to compute a third set of LLRs that assumes a QPSK modulation scheme for the interfering UE. The LLR computation block 313 provides the LLRs resulting from this process to the channel decoder 314.

According to another embodiment of the invention, the LLR computation block 313 reduces interference as follows: The LLR computation block 313 calculates the LLR for the i-th channel bit of, $LLR_{1,i}$ by assuming an unknown modulation order for the interfering UE, assuming equal probability of 16QAM and 64QAM, and using the following equations:

$$LLR_{1,i} = \ln\left[\frac{P(x|b_{1,i}=1)}{P(x|b_{1,i}=0)}\right] = \qquad (5)$$

$$\ln\left[\frac{\sum_{k:b_{1,i}=1}\sum_{j\in 16QAM} P(x|s_{1,k},s_{2,j})\cdot P(s_{1,k})\cdot P(s_{2,j}) + \sum_{k:b_{1,i}=1}\sum_{j\in 64QAM} P(x|s_{1,k},s_{2,j})\cdot P(s_{1,k})\cdot P(s_{2,j})}{\sum_{k:b_{1,i}=0}\sum_{j\in 16QAM} P(x|s_{1,k},s_{2,j})\cdot P(s_{1,k})\cdot P(s_{2,j}) + \sum_{k:b_{1,i}=0}\sum_{j\in 64QAM} P(x|s_{1,k},s_{2,j})\cdot P(s_{1,k})\cdot P(s_{2,j})}\right]$$

If all QAM symbols in a certain modulation scheme have an equal probability, The LLR computation block 313 calculates the LLR for the i-th channel bit of, $LLR_{1,i}$ by approximating the above equation as follows:

$$LLR_{1,i} = \ln\left[\frac{\sum_{k:b_{1,i}=1}\sum_{j\in 16QAM} P(x|s_{1,k},s_{2,j})\cdot\frac{1}{16} + \sum_{k:b_{1,i}=1}\sum_{j\in 64QAM} P(x|s_{1,k},s_{2,j})\cdot\frac{1}{64}}{\sum_{k:b_{1,i}=0}\sum_{j\in 16QAM} P(x|s_{1,k},s_{2,j})\cdot\frac{1}{16} + \sum_{k:b_{1,i}=0}\sum_{j\in 64QAM} P(x|s_{1,k},s_{2,j})\cdot\frac{1}{64}}\right] \approx \qquad (6)$$

$$\min\left(\min_{k:b_{1,i}=1}\min_{j\in 16QAM}\frac{\|x-H[s_{1,k}\ s_{2,j}]^T\|^2}{\|n\|^2}, \min_{k:b_{1,i}=1}\min_{j\in 64QAM}\frac{\|x-H[s_{1,k}\ s_{2,j}]^T\|^2}{\|n\|^2} + \ln 4\right) -$$

$$\min\left(\min_{k:b_{1,i}=0}\min_{j\in 16QAM}\frac{\|x-H[s_{1,k}\ s_{2,j}]^T\|^2}{\|n\|^2}, \min_{k:b_{1,i}=0}\min_{j\in 64QAM}\frac{\|x-H[s_{1,k}\ s_{2,j}]^T\|^2}{\|n\|^2} + \ln 4\right)$$

Furthermore, the Euclidean distance can be replaced by other distances such as Manhattan distance for further simplification of calculation. Thus, equations (6) use two soft metrics: one 16QAM and one 64QAM. The term $$\frac{\|x-H[s_{1,k}\ s_{2,j}]^T\|}{\|n\|}$$

and the similar terms of the equations (6) are types of distance metrics. The term ln 4 is a type of constant term, which may be derived after simplification and cancellation based on the sizes of hypothesized modulation schemes (e.g. 16QAM and 64QAM). The newly defined LLR above can also be computed by reusing the existing LLR computation blocks with the appropriate modifications.

According to yet another embodiment of the invention, the LLR computation block 313 reduces interference as follows: The LLR computation block 313 calculates the LLR by assuming a modified 64QAM constellation (or a reference constellation) for the interfering UE, where the inner 16 points of the 64QAM constellation are replaced by four distinct values from the 16QAM constellation. This is illustrated in FIG. 4, in which each of four box-shaped groupings 408 includes four points (represented by the circles) of the 64QAM modulation scheme and one point (represented by the cross) of the 16 QAM modulation scheme. The resulting constellation map substitutes the single cross for the four circles in each of the box-shaped groupings. However, the single cross may now have a greater weight than each of the four circles (e.g., four times the weight).

According to still another embodiment of the invention, the LLR computation block 313 reduces interference as follows: The LLR computation block 313 assumes a modified 64QAM constellation (or a reference constellation) for the interfering UE, where the outer 28 points and inner 16 points of the 64QAM constellation are replaced by 16QAM points. This is illustrated in FIG. 5, in which each of four box-shaped groupings 508 includes four points (represented by the circles) of the 64QAM modulation scheme and one point (represented by the cross) of the 16 QAM modulation scheme; each of the rectangular-shaped groupings 510 contains two points of the 64QAM constellation and one point of the 16QAM constellation; and each of the oval-shaped groupings 512 contains three points of the 64QAM constellation and one point of the 16QAM constellation. The resulting constellation map substitutes the single cross for the four circles in each of the box-shaped groupings; the single cross for the two circles of the rectangle-shaped groupings; and the single cross for the three circles of the oval-shaped groupings. However, the single cross may now have a greater weight than each of the circles that it has replaced (e.g., four times the weight, two times the weight, or three times the weight, respectively).

According to still another embodiment of the invention, the LLR computation block 313 reduces interference as follows: The LLR computation block 313 assumes a modified 64QAM constellation (or a reference constellation) for the interfering UE, where the corner 12 points and inner 16 points of the 64QAM constellation are replaced by 16QAM points. This is illustrated in FIG. 6, in which each of four box-shaped groupings 608 includes four points (represented by the circles) of the 64QAM modulation scheme and one point (represented by the cross) of the 16 QAM modulation scheme; and each of the oval-shaped groupings 610 contains three points of the 64QAM constellation and one point of the 16QAM constellation. The resulting constellation map substitutes the single cross for the four circles in each of the box-shaped groupings and the single cross for the three circles of the oval-shaped groupings. However, the single cross may now have a greater weight than each of the circles that it has replaced (e.g., four times the weight or three times the weight, respectively).

The embodiments discussed in conjunction with FIGS. 4-6 represent a creation of a modified or reference or "fourth" modulation scheme that is different from any modulation scheme that the communication system (e.g., the system 100 of FIG. 1) recognizes. This fourth modulation scheme may be a hybrid or combination of modulation schemes that are recognized by the communication system (e.g., a hybrid of the second and third modulation schemes). For example, if the communication system only recognizes QPSK, 16QAM and 64QAM, the fourth modulation scheme may be a hybrid or combination of 16QAM and 64QAM (as are some of the previous embodiments).

The operation of the receiver 300 (FIG. 3) according to an embodiment of the invention will now be described with reference to the flowchart of FIG. 7. At step 700, the equalizer 312 receives digital data from the DFT module 310. At step 702, the LLR computation block 313 of the equalizer 312 references a constellation diagram (such as one of the constellation diagrams depicted in FIGS. 4-6). The constellation diagram used by the LLR (or soft value) computation block (including constellation diagrams of modulation schemes recognized by the communication system and the constellation diagrams of the hybrid modulation schemes not recognized by the communication system) may be pre-stored in a memory of the receiver 300. At step 704, LLR computation block 313 calculates a set of LLRs or soft values for each code word based on one of the methods described above. At step 706, the equalizer 312 provides the calculated set of LLRs to the channel decoder 314, and the channel decoder decodes the soft bits represented by the LLRs and outputs information bits.

Figure 7:
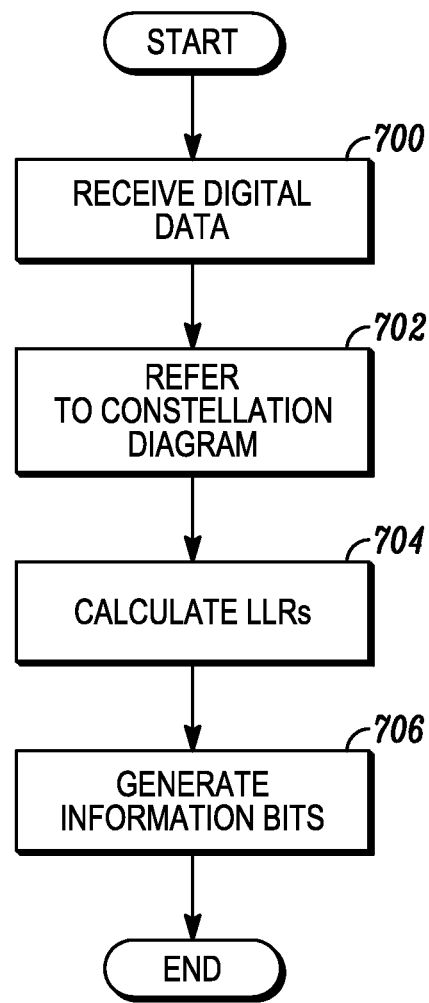
FIG. 7 is a flowchart depicting the operation of the equalizer of FIG. 3 according to an embodiment of the invention.

As an alternative to the steps of FIG. 7, there may be a decision point at the beginning of the procedure in which receiver first determines whether there is a second signal. If there is a second signal, the receiver performs the steps described in conjunction with FIG. 7. If there is no second signal, then the LLR computation block 313 of the equalizer 312 references only a constellation diagram for the modulation scheme associated with the first spatial layer (which may be indicated in a scheduling assignment message) at step 702. A set of LLRs for each code word may be calculated by considering only the first spatial layer at step 704.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A method for demodulating a signal in a communication system that supports one or more modulations schemes for communicating with one or more user equipments (UEs), the method comprising:
   receiving a signal on a time-frequency resource at a UE, the signal comprising a plurality of spatial layers, the plurality of spatial layers comprising a first spatial layer and a second spatial layer,
      wherein at least the first spatial layer of the plurality of spatial layers is intended for the UE,
      wherein the first spatial layer includes a data stream, wherein the data stream is mapped on the first spatial layer;
   receiving, in a message, an indication of a first modulation scheme that is associated with the first spatial layer,
      wherein the message does not indicate a modulation scheme associated with the second spatial layer; and
   calculating a soft value associated with a channel-coded bit of a code word of the data stream based on the first modulation scheme, a second modulation scheme and a third modulation scheme, the second and third modulation schemes representing a hypothesis of the modulation scheme associated with the second spatial layer, and
      wherein the calculating step comprises calculating the soft value based on a first and a second soft metric, wherein the first soft metric is based on the first and the second modulation scheme and the second soft metric based on the first and the third modulation scheme,
      wherein the first, the second, and the third modulation schemes are among the one or more modulation schemes supported by the communication system.

2. The method of claim 1, wherein, in addition to the first spatial layer, the data stream is mapped on one or more other spatial layers of the plurality of spatial layers of the signal, wherein the data stream is mapped on a set of spatial layers of the plurality of spatial layers, and the first modulation scheme is associated with the data stream on at least one of the set of spatial layers to which the data stream is mapped.

3. The method of claim 1, wherein the soft value represents a probability of the bit being a 1 or a 0.

4. The method of claim 1, wherein the UE is unaware of the existence of the second spatial layer.

5. The method of claim 1, wherein the message is a scheduling assignment message.

6. The method of claim 1, wherein the calculating step comprises calculating the soft value based on an average of the first and the second soft metrics.

7. The method of claim 1, wherein the soft metric is a log-likelihood ratio.

8. The method of claim 6, wherein the average is a weighted average.

9. The method of claim 1, wherein at least one of the first and second soft metric comprises a constant term and a distance metric, wherein the distance metric is calculated based on either the second or third modulation scheme and the received signal.

10. The method of claim 9, wherein the constant term is based on a symbol probability of at least one of the second and the third modulation scheme.

11. The method of claim 9, wherein the constant term is based on a cardinality of at least one of the second and the third modulation scheme.

12. The method of claim 9, wherein the constant term is based on a ratio of a cardinality of the second modulation scheme to a cardinality of the third modulation scheme.

13. The method of claim 1, further comprising generating an information bit based on the calculated soft value of the channel-coded bit.

14. The method of claim 1, wherein the UE is a first UE, and wherein the second spatial layer is intended for a second UE.

15. The method of claim 1, wherein the second modulation scheme is a 16QAM scheme and the third modulation scheme is a 64QAM modulation scheme.

16. The method of claim 14, wherein the first UE is unaware of the existence of the second UE.

17. The method of claim 14, wherein the first UE is aware of the second spatial layer but is unaware of the modulation scheme associated with the second spatial layer.

18. The method of claim 1, further comprising demodulating and decoding the first spatial layer and converting the data stream into a stream of information bits, the stream of information bits being organized into one or more transport blocks.

19. An apparatus for demodulating a signal in a communication system that recognizes one or more modulation schemes, the communication the apparatus comprising:
a first user equipment (UE);
a second UE;
a wireless access point (AP)
the first UE further comprising a receiver that performs steps comprising:
receiving a signal on a time-frequency resource from the AP, the signal comprising a plurality of spatial layers, the plurality of spatial layers comprising a first spatial layer and a second spatial layer, wherein the first spatial layer is intended for the first UE and the second spatial layer is intended for the second UE, wherein the first spatial layer includes a data stream that is mapped on the first spatial layer;
receiving a scheduling assignment message from the AP, the scheduling assignment message indicating a first modulation scheme, wherein the first modulation scheme is associated with the first spatial layer, wherein the scheduling assignment message does not indicate a modulation scheme associated with the second spatial layer;
translating the signal from a carrier frequency to a baseband signal,
converting the signal into digital data,
converting the signal from a time domain to a frequency domain,
calculating a soft value associated with a channel-coded bit of a code word of the data stream based on the first modulation scheme, a second modulation scheme and a third modulation scheme, the second and third modulation schemes representing a hypothesis of the modulation scheme associated with the second spatial layer, and wherein the calculating step comprises calculating the soft value based on a first and a second soft metric, wherein the first soft metric is based on the first and the second modulation scheme and the second soft metric based on the first and the third modulation scheme,
wherein the first, the second, and the third modulation schemes are among the one or more modulation schemes supported by the communication system.

20. A method for demodulating a signal in a communication system that supports one or more modulations schemes for communicating with one or more user equipments (UEs), the method comprising:
receiving a signal on a time-frequency resource at a UE, the signal comprising a plurality of spatial layers, the plurality of spatial layers comprising a first spatial layer and a second spatial layer,
wherein at least the first spatial layer of the plurality of spatial layers is intended for the UE,
wherein the first spatial layer includes a data stream,
wherein the data stream is mapped on the first spatial layer;
receiving, in a message, an indication of a first modulation scheme that is associated with the first spatial layer,
wherein the message does not indicate a modulation scheme associated with the second spatial layer; and
calculating a soft value associated with a channel-coded bit of a code word of the data stream based on the first modulation scheme, a second modulation scheme and a third modulation scheme, the second and third modulation schemes representing a hypothesis of the modulation scheme associated with the second spatial layer,
wherein the first, the second, and the third modulation schemes are among the one or more modulation schemes supported by the communication system,
wherein, in addition to the first spatial layer, the data stream is mapped on one or more other spatial layers of the plurality of spatial layers of the signal, wherein the data stream is mapped on a set of spatial layers of the plurality of spatial layers, and the first modulation scheme is associated with the data stream on at least one of the set of spatial layers to which the data stream is mapped.

21. A method for demodulating a signal in a communication system that supports one or more modulations schemes for communicating with one or more user equipments (UEs), the method comprising:
receiving a signal on a time-frequency resource at a UE, the signal comprising a plurality of spatial layers, the plurality of spatial layers comprising a first spatial layer and a second spatial layer,
wherein at least the first spatial layer of the plurality of spatial layers is intended for the UE,
wherein the first spatial layer includes a data stream,
wherein the data stream is mapped on the first spatial layer;
receiving, in a message, an indication of a first modulation scheme that is associated with the first spatial layer,
wherein the message does not indicate a modulation scheme associated with the second spatial layer; and
calculating a soft value associated with a channel-coded bit of a code word of the data stream based on the first modulation scheme, a second modulation scheme and a third modulation scheme, the second and third modulation schemes representing a hypothesis of the modulation scheme associated with the second spatial layer,
wherein the first, the second, and the third modulation schemes are among the one or more modulation schemes supported by the communication system;
demodulating and decoding the first spatial layer and converting the data stream into a stream of information bits, the stream of information bits being organized into one or more transport blocks.

* * * * *